United States Patent
Liao et al.

(10) Patent No.: US 7,201,947 B2
(45) Date of Patent: Apr. 10, 2007

(54) CPP AND MTJ READER DESIGN WITH CONTINUOUS EXCHANGE-COUPLED FREE LAYER

(75) Inventors: Simon Liao, Fremont, CA (US); Kochan Ju, Fremont, CA (US); Youfeng Zheng, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 865 days.

(21) Appl. No.: 10/238,269

(22) Filed: Sep. 10, 2002

(65) Prior Publication Data

US 2004/0047085 A1    Mar. 11, 2004

(51) Int. Cl.
*B29C 35/08* (2006.01)

(52) U.S. Cl. ............... 427/598; 427/599; 427/131; 427/132; 360/324.2

(58) Field of Classification Search ............. 427/598, 427/599, 131, 132; 360/324.2
See application file for complete search history.

(56) References Cited

U.S. PATENT DOCUMENTS

| | | | | |
|---|---|---|---|---|
| 5,089,862 A * | 2/1992 | Warner et al. | ............ | 326/44 |
| 5,883,763 A | 3/1999 | Yuan et al. | ............ | 360/113 |
| 6,084,752 A | 7/2000 | Sakakima et al. | ............ | 360/113 |
| 6,219,212 B1 | 4/2001 | Gill et al. | ............ | 360/324.2 |
| 6,249,407 B1 | 6/2001 | Aoshima et al. | ............ | 360/324.2 |
| 2003/0048676 A1* | 3/2003 | Daughton et al. | ............ | 365/200 |

OTHER PUBLICATIONS

C. Vouille et al., "Microscopic mechanisms of giant magneto-resistance," Physical Review B, vol. 60, No. 9, Sep. 1999, pp. 6710-6722.

Robert Rottmayer and Jian-Gang Zhu, "A New Design for an Ultra High Density Magnetic Recording Head Using a GMR Sensor in the CPP Mode," IEEE Trans. on Magnetics, vol. 31, No. 6, Nov. 1995, pp. 2597-2599.

* cited by examiner

*Primary Examiner*—Alain L. Bashore
(74) *Attorney, Agent, or Firm*—Saile Ackerman LLC; Stephen B. Ackerman

(57) ABSTRACT

As track widths of magnetic read heads grow very small, conventional longitudinal bias stabilization has been found to no longer be suitable since the strong magnetostatic coupling at the track edges also pins the magnetization of the free layer. This problem has been overcome by extending the free layer so that it is no longer confined to the area immediately below the spacer or tunneling layer. A longitudinal bias layer immediately below the free layer is given a relatively weak magnetic exchange coupling field of about 200 Oe. Although there is strong exchange coupling between this and the free layer, the degree of pinning of the free layer is low so that the device's output signal is reduced by less than about 10%. A process for manufacturing both the CPP SV and a MTJ versions of the invention is described.

7 Claims, 2 Drawing Sheets

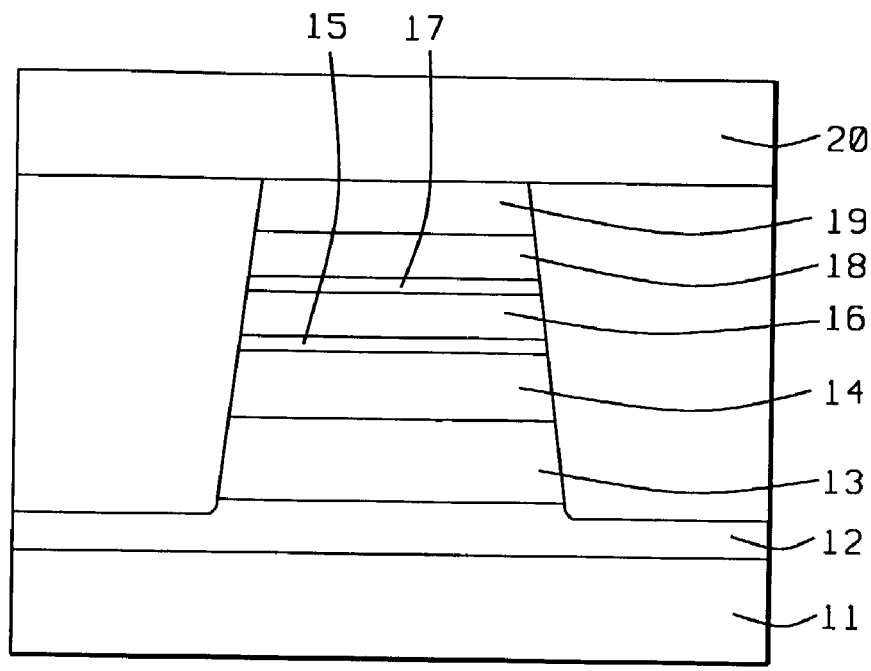
FIG. 1 - Prior Art
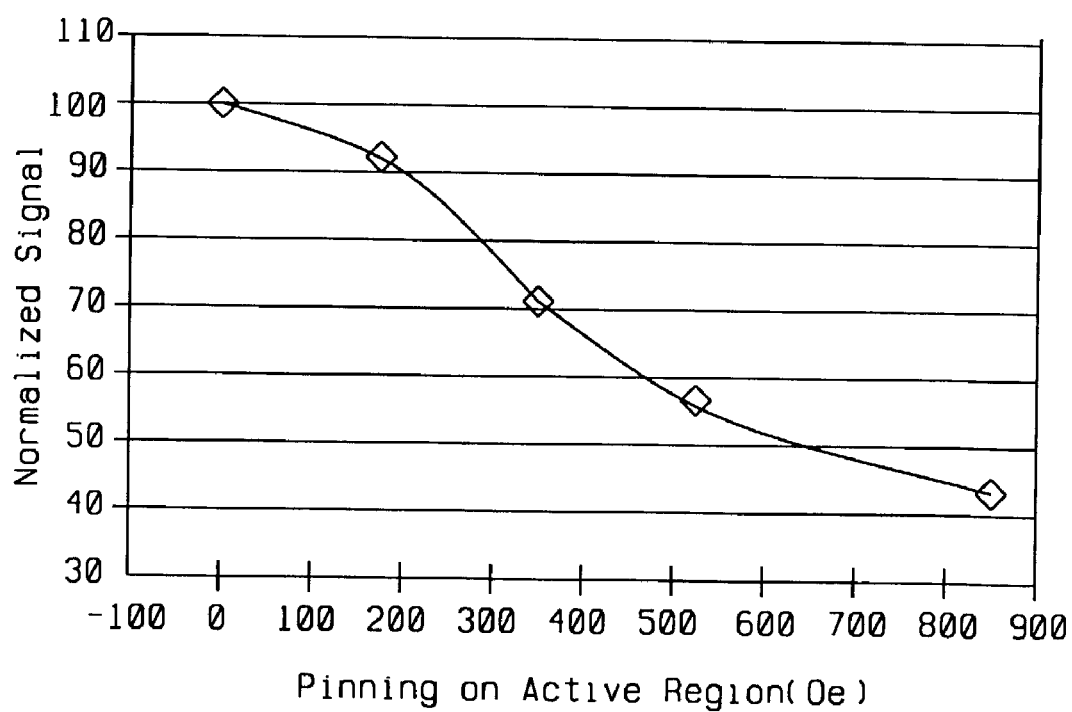
FIG. 2

CPP AND MTJ READER DESIGN WITH CONTINUOUS EXCHANGE-COUPLED FREE LAYER

FIELD OF THE INVENTION

The invention relates to the general field of magnetic storage devices with particular reference to read heads in disk systems.

BACKGROUND OF THE INVENTION

The principle governing the operation of most current magnetic read heads is the change of resistivity of certain materials in the presence of a magnetic field (magneto-resistance or MR). Magneto-resistance can be significantly increased by means of a structure known as a spin valve or SV. The resulting increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are a low coercivity (free) ferromagnetic layer, a non-magnetic spacer layer, and a high coercivity ferromagnetic layer. The latter is usually formed out of a soft ferromagnetic layer that is pinned magnetically by a nearby layer of antiferromagnetic material. Additionally, a synthetic antiferromagnet (formed by sandwiching an antiferromagnetic coupling layer between two antiparallel ferromagnetic layers) may be used to replace the ferromagnetic pinned layer. This results in an increase in the size of the pinning field so that a more stable pinned layer is obtained. We will refer to it as a synthetically pinned device.

When the free layer is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field. If the direction of the pinned field is parallel to the free layer, electrons passing between the free and pinned layers, suffer less scattering. Thus, the resistance at this state is lower. If, however, the magnetization of the pinned layer is anti-parallel to that of the free layer, electrons moving from one layer into the other will suffer more scattering so the resistance of the structure will increase. The change in resistance of a spin valve is typically 8–20%.

Most GMR devices have been designed so as to measure the resistance of the free layer for current flowing parallel to the film's plane. However, as the quest for ever greater densities continues, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible while the resistance of the leads into and out of the device need not be particularly low. By contrast, in a CPP device, the resistivity of both the leads and the other GMR stack layers dominate and should be as low as possible.

A device that is particularly well suited to the CPP design is the magnetic tunneling junction (MTJ) in which the layer that separates the free and pinned layers is a non-magnetic insulator, such as alumina or silica. Its thickness needs to be such that it will transmit a significant tunneling current. The principle governing the operation of the MTJ is the change of resistivity of the tunnel junction between two ferromagnetic layers. When the magnetization of the two ferromagnetic layers is in opposite directions, the tunneling resistance increases due to a reduction in the tunneling probability. The change of resistance is typically about 40%.

Although the layers enumerated above are all that is needed to produce the GMR or MTJ effects, additional problems remain. In particular, there are certain noise effects associated with such a structure. Magnetization in a layer can be irregular because of reversible breaking of magnetic domain walls, leading to the phenomenon of Barkhausen noise. The solution to this problem has been to provide a device structure conducive to ensuring that the free layer is a single domain and to ensure that the domain configuration remains unperturbed after processing and fabrication steps and under normal operation. For CIP devices this was most commonly accomplished by giving the structure a permanent longitudinal bias provided by two opposing permanent magnets located at the sides of the device.

As track widths grow very small (<0.2 microns), the above biasing configuration has been found to no longer be suitable since the strong magnetostatic coupling at the track edges also pins the magnetization of the free layer which drastically reduces the SV or MTJ sensor sensitivity. The solution to this problem that has been adopted by the prior art is illustrated in FIG. 1 for the case of an MTJ but is similarly applicable to an SV.

Seen in FIG. 1 is a bottom magnetic shield 11 on which rests a lower contact layer 12. The so-called pillar structure begins with pinned layer 14 which rests on anti-ferromagnetic (pinning) layer 13. Free layer 16 is separated from layer 14 by insulating layer 15 (which would be a non-magnetic metal layer if this were an SV). Longitudinal stabilization of free layer 16 is effected through a second (weaker) antiferromagnetic layer 18. To reduce the pinning effects of layer 18 on free layer 16, a very thin non-magnetic layer 17 is inserted between 16 and 18 to reduce the exchange coupling between them. The rest of the structure is routine—upper contact layer 19 and top magnetic shield 20.

The main problem associated with the design shown in FIG. 1 is that, because of the very small width of the free layer, its tendency to demagnetize is very strong so the intentionally weak coupling between it and layer 18 is often insufficient to provide the degree of longitudinal stabilization that is needed.

The present invention discloses an alternative design in which this problem is significantly reduced.

A routine search of the prior art was performed with the following references of interest being found:

In U.S. Pat. No. 5,883,763, Yuan et al. show a CPP GMR while U.S. Pat. No. 6,219,212 B1 (Gill et al.) discloses an MTJ structure. Sakakima shows both MTJ and CPP structures in U.S. Pat. No. 6,084,752 and, in U.S. Pat. No. 6,249,407 B1, Aoshima et al. show a CPP MR structure.

SUMMARY OF THE INVENTION

It has been an object of at least one embodiment of the present invention to provide a Current Perpendicular to Plane Spin Valve (CPP SV) or a magnetic tunnel junction (MTJ) for use as a read head in a magnetic information storage system.

Another object of at least one embodiment of the present invention has been that the pinned layers of these devices be longitudinally well stabilized.

Still another object of at least one embodiment of the present invention has been to provide a process for manufacturing said CPP SV and MTJ.

These objects have been achieved by extending the free layer so that it is no longer confined to the area immediately below the spacer or tunneling layer. A longitudinal bias layer immediately below the free layer is given a relatively weak magnetic coupling field of about 200 Oe. Although there is exchange coupling between this and the free layer, the degree of pinning of the free layer is low so that the device's output signal is reduced by less than about 10%.

BRIEF DESCRIPTION OF THE DRAWINGS

FIG. 1 is a cross-sectional view of a MTJ of the prior art.

FIG. 2 is a computed plot of signal strength as a function of pinning intensity at the free layer.

DESCRIPTION OF THE PREFERRED EMBODIMENTS

We preface our description of the present invention by first referring to FIG. 2 which is a plot (obtained through calculation) of the normalized signal from a CPP SV as a function of the degree of pinning (in Oe) of its free layer. This data shows that a pinning field of up to about 200 Oe can be applied to the free layer with a resulting signal loss of less than 10%. The present invention derives from our position that this is a worth-while tradeoff.

Figure 3:
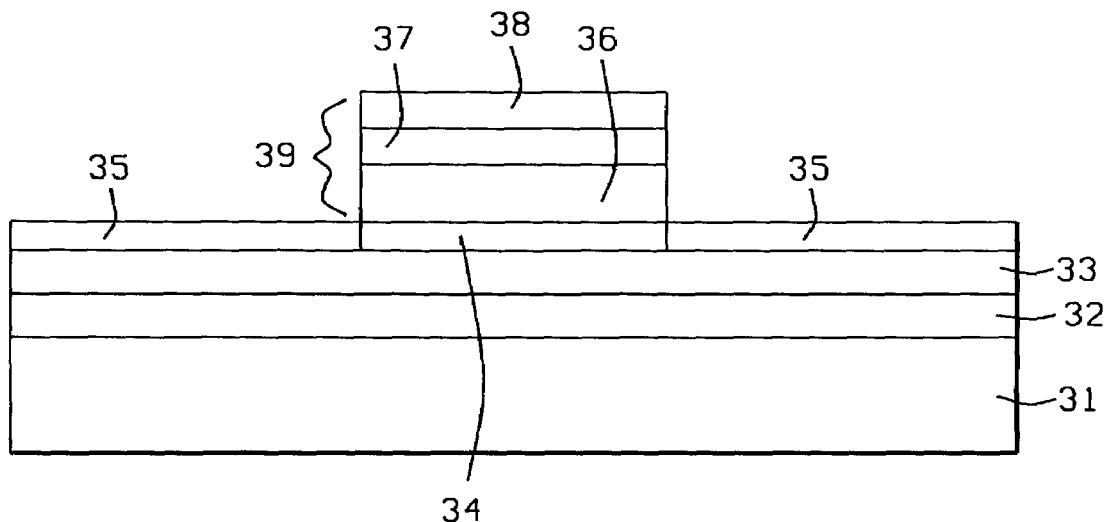
FIG. 3 is a cross-sectional view of a CPP SV made according to the process of the present invention.

We will disclose the present invention by describing a process for its manufacture. This will also make clear the structure of the present invention:

Referring now to FIG. 3, the process begins with the provision of a lower magnetic shield layer and depositing thereon a conductive lead layer followed by a seed layer. For purposes of simplification, all three layers are shown in the figure as a single layer 31. This is followed by the deposition of longitudinal bias stabilization layer 32 on the seed layer (top of layer 31). This longitudinal bias stabilization layer is a material such as, but not limited to, IrMn, RuRhMn, PdPtMn, PtMn, and NiMn and it is deposited to a thickness between about 30 and 100 Angstroms.

Then, free layer 33 is deposited onto longitudinal bias stabilization layer 32, following which copper spacer layer 34/35 is laid down. Free layer 33 is deposited to a thickness between about 10 and 80 Angstroms and could be any low coercivity material such as CoFe or NiFe while copper spacer layer 34/35 is deposited to a thickness between about 15 and 100 Angstroms. Note that at this stage 34/35 is a single continuous layer of copper.

Next is the deposition of pinned layer 36 on copper spacer layer 34/35 followed by antiferromagnetic pinning layer 37 and, finally, upper conductive lead layer 38.

Using a mask (not shown) to define the pillar structure (GMR or TMJ stack), etching of all unexposed layers down as far as copper layer 34/35 is performed, resulting in the formation of pedestal 39. This pedestal typically has a length between about 0.1 and 0.2 microns, a width between about 0.01 and 0.2 microns, and a height between about 0.01 and 0.03 microns. The etch method used is ion milling, applied at a temperature between about 25 and 50° C., which is chosen since the point at which copper removal begins is easily detected, thereby enabling layer 34/35 to act as an etch stop layer. The resulting read head is as seen in the figure.

For the case of a CPP SV magnetic read head, the process at this point offers a choice between two embodiments. In the first of these, all unexposed copper is fully oxidized so that layer 34 remains unchanged as a copper spacer layer while layer 35 is converted to copper oxide, thereby reducing the resistance of the structure and offering some protection to layer 33 during subsequent processing. Full oxidation of the copper either occurred naturally or was achieved by means of plasma oxidation.

In the other embodiment of the process for a SV, layer 35 is fully removed instead being converted to oxide. This was also achieved by ion milling.

The process concludes with a heating of the structure in a magnetic field of between about 1,000 and 5,000 oersted for between about 60 and 120 minutes at a temperature between about 200 and 250° C. so as to impart a suitable magnetic exchange coupling field (between about 150 and 250 Oe) to layer 32 thereby enabling it to provide a high degree of longitudinal stabilization for free layer 32. As noted earlier, the price of obtaining this high level of stabilization is a reduction of the output signal of the GMR stack of less than about 10%.

Figure 4:
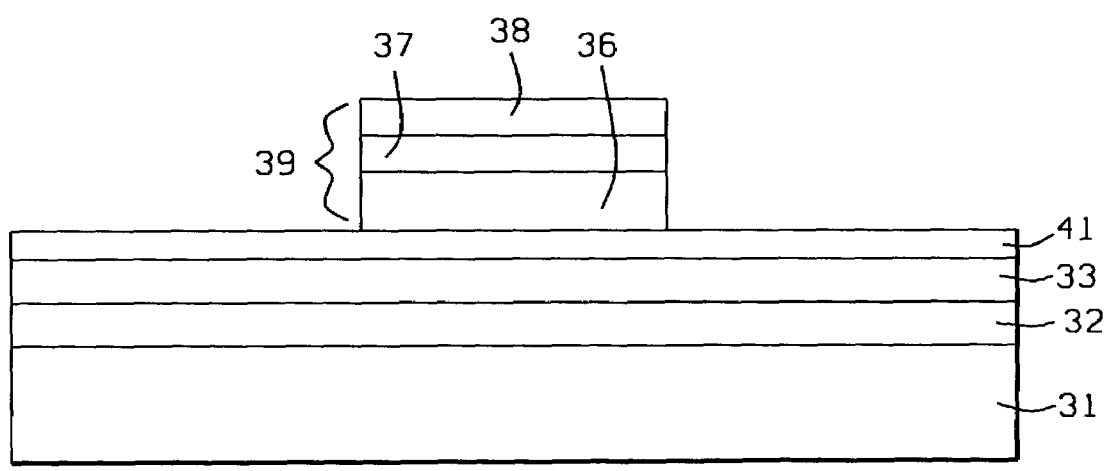
FIG. 4 is a cross-sectional view of a MTJ made according to the process of the present invention.

The process described above is readily applied to the manufacture of a MTJ device, the main difference being that layer 34/35 of FIG. 3 is replaced by insulating layer 41, as shown in FIG. 4, layer 41 being left unchanged at the end of the process. Etching to form the pedestal was achieved using ion milling at a temperature between about 25 and 50° C., whereby said dielectric layer now acted as the etch stop layer. Possible materials for dielectric layer 41 include, but are not limited to, aluminum oxide and aluminum hafnium oxide. It was deposited to a thickness between about 4 and 10 Angstroms.

We note here that all layers deposited as part of the above-described processes may be laid down during a single pumpdown. This guarantees the presence of clean interfaces between all layers.

What is claimed is:

1. A process to manufacture a magnetic tunnel junction read head, comprising:

providing a lower conductive lead layer and depositing thereon a magnetic shield layer followed by a seed layer;

depositing a longitudinal bias stabilization layer on said seed layer;

depositing a free layer on said longitudinal bias stabilization layer;

on said free layer, depositing a dielectric layer;

depositing a pinned layer on said dielectric layer, an antiferromagnetic pinning layer on said pinned layer, and an upper conductive lead layer on said antiferromagnetic pinning layer;

through a mask that defines a magnetic tunnel junction stack having an output signal, etching all unexposed layers down as far as said dielectric layer, thereby forming a CPP SV magnetic read head; and heating said read head in a magnetic field for a period of time whereby said longitudinal bias stabilization layer acquires a magnetic exchange coupling field of between about 150 and 250 Oe, thereby providing longitudinal stabilization for said free layer and reducing said output signal from said magnetic read head by less than about 10%.

2. The process described in claim 1 wherein the step of etching all unexposed layers down as far as said dielectric layer further comprises ion milling at a temperature between about 25 and 50% C, whereby said conductive lead layer acts as an etch stop layer.

3. The process described in claim 1 wherein said longitudinal bias stabilization layer is selected from the group consisting of lrMn, RuRhMn, NiMn, PdPtMn, and PtMn.

4. The process described in claim 1 wherein said longitudinal bias stabilization layer is deposited to a thickness between about 30 and 100 Angstroms.

5. The process described in claim 1 wherein said dielectric layer is deposited to a thickness between about 3 and 10 Angstroms.

6. The process described in claim 1 wherein said dielectric layer is selected from the group consisting of aluminum oxide and aluminum hafnium oxide.

7. The process described in claim 1 wherein all layers are deposited during a single pumpdown.

* * * * *